(12) United States Patent
Sprenger

(10) Patent No.: US 6,336,277 B1
(45) Date of Patent: Jan. 8, 2002

(54) MEASURING STOP DEVICE FOR A DISTANCE-MEASURING APPARATUS

(75) Inventor: Franz Sprenger, Widnau (CH)

(73) Assignee: Leica Geosystems AG, Heerbrugg (CH)

( * ) Notice: Subject to any disclaimer, the term of this patent is extended or adjusted under 35 U.S.C. 154(b) by 0 days.

(21) Appl. No.: 09/331,156

(22) PCT Filed: Nov. 5, 1997

(86) PCT No.: PCT/EP97/06109

§ 371 Date: Jul. 15, 1999

§ 102(e) Date: Jul. 15, 1999

(87) PCT Pub. No.: WO98/27439

PCT Pub. Date: Jun. 25, 1998

(30) Foreign Application Priority Data

Dec. 17, 1996 (DE) .......................... 196 52 438

(51) Int. Cl.⁷ .............................. G01B 3/02; B43L 7/10
(52) U.S. Cl. ............................. 33/758; 33/492; 33/809; 33/465
(58) Field of Search ............................. 33/758, 16, 282, 33/285, 286, 374, 375, 376, 465, 492, 755, 759, 806, 809, 810, 811, 812

(56) References Cited

U.S. PATENT DOCUMENTS

| | | | | |
|---|---|---|---|---|
| 1,186,853 A | * | 6/1916 | Smith | 33/755 |
| 1,567,602 A | * | 12/1925 | Keuffel | 33/758 |
| 2,270,355 A | * | 1/1942 | Swanson | 33/809 |
| 2,570,430 A | * | 10/1951 | Cramer | 33/375 |
| 3,913,232 A | * | 10/1975 | Marcell | 33/755 |
| 4,566,198 A | | 1/1986 | Vitale | |
| 5,894,677 A | * | 4/1999 | Hoffman | 33/758 |

FOREIGN PATENT DOCUMENTS

| | | |
|---|---|---|
| EP | 0 738 899 | 10/1996 |
| GB | 205401 | 10/1923 |
| GB | 499819 | 1/1939 |

* cited by examiner

Primary Examiner—Christopher W. Fulton
(74) Attorney, Agent, or Firm—Foley & Lardner

(57) ABSTRACT

The invention concerns a measuring stop device for a distance-measuring apparatus (4), said device comprising a rear measuring stop (1) which runs perpendicular to the measuring direction (6), is linear and is divided into at least two measuring stop regions (1a, 1b), at least one measuring stop region (1b) being rotatable about an axis (3) running parallel to the measuring direction (6). If the measuring stop regions (1a, 1b) are aligned one behind the other, a distance can be measured from a transversal intersecting a vertex and is used, for example, for determining the diagonals of a surface. In order to measure distances from a flat surface, a stable support surface which is perpendicular to the measuring direction (6) can be provided by rotating the rotatable measuring stop region (1b) accordingly.

13 Claims, 2 Drawing Sheets

Figure 1A:
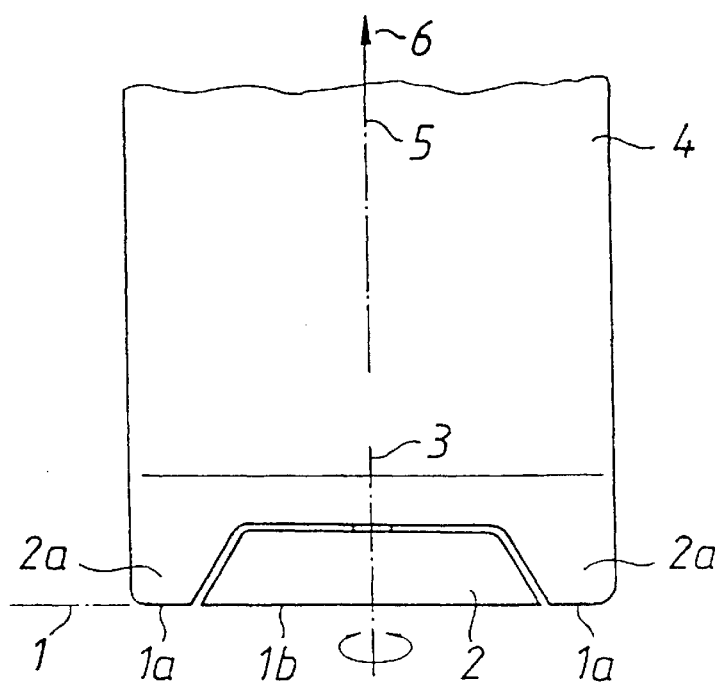

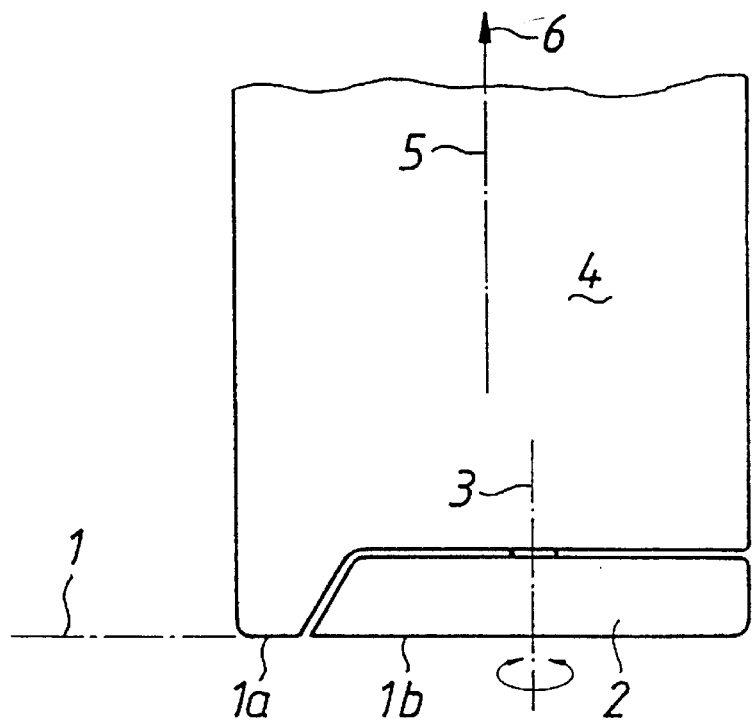
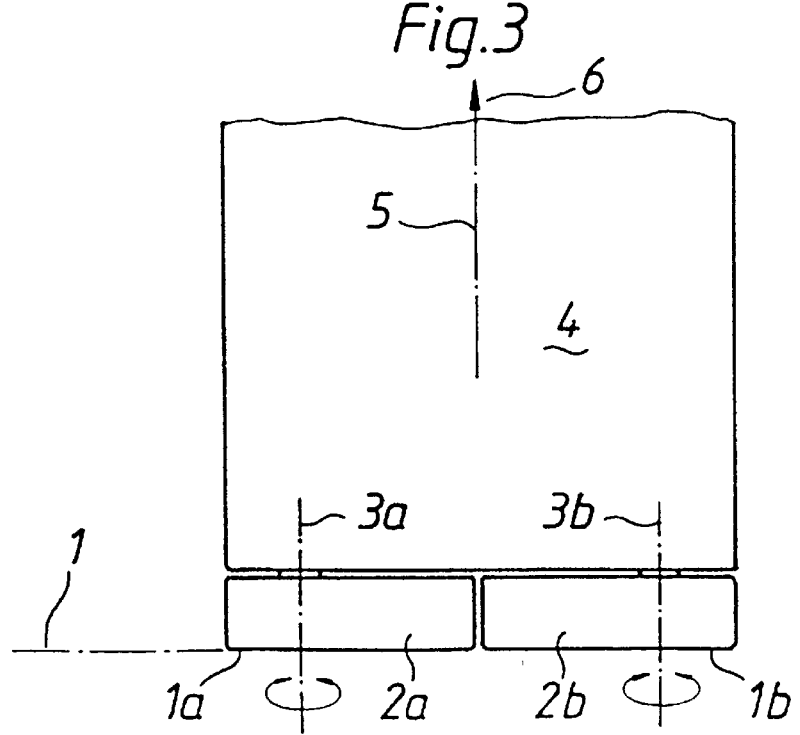

MEASURING STOP DEVICE FOR A DISTANCE-MEASURING APPARATUS

The invention relates to a measuring stop device for a distance-measuring apparatus which can be held in the hand, according to the features described herein.

GB-A-499819 discloses a meter measure having a steel tape which can be rolled up, the extensive rear measuring stop of which measure can be swivelled out upwards by rotation about an axis parallel to the measuring direction. With a measuring stop swivelled out upwards and with the meter measure placed on the floor, it is possible to make contact with a bowling ball at the height of its radius and to carry out a distance measurement.

The optoelectronic distance measuring apparatus disclosed in WO 94/27164 or described in the "Distol" instructions for use from Leica AG, 9435 Heerbrugg, Switzerland, in 1994 is a hand-held measuring apparatus with which distances to an object point can be measured optically. The distance to the object point is measured either from a front or from a rear measuring stop of the distance-measuring apparatus. The measuring stops used are in general the front and rear housing surfaces of the distance-measuring apparatus, which make a right angle with the measuring direction. The two measuring stops are each coordinated with a separate measuring key on the key panel of the measuring apparatus, the pressing of which initiates a corresponding distance measurement and shows the measured distance value on a display.

Such optoelectronic distance measuring apparatuses are predominantly used in surveying in the building industry. A semiconductor laser diode emitting in the visible red wavelength range produces a light spot on the object so that it is possible to sight exactly that point of the object to which the distance is to be determined.

In addition, in the case of right-angled rooms, individual areas or the volume of the room can also be automatically determined by the distance measuring apparatus by measurement of the length, width and height and can be shown on the display. Often it is also intended to measure the diagonals of the area, for checking purposes. Since, however, the extensive rear measuring stop of the distance-measuring apparatus cannot be positioned in the corner line of two adjacent wall surfaces, the distance-measuring apparatus additionally has a corner-measuring bracket which can be swivelled out. When swivelled out, the corner-measuring bracket thus serves as a measuring stop for the corner line. With the aid of the visible laser spot, the diagonally opposite corner line can be sighted and the distance to it, i.e. the length of the diagonal of the associated area, can be determined.

However, the actual distance measurement is still effected only from the rear, regular measuring stop. The user must therefore add the depth of the corner-measuring bracket itself to the measured result displayed. The depth of the swivelled-out corner-measuring bracket, i.e. the distance between the rear measuring stop of the distance-measuring apparatus and the corner line, is known. In such a distance determination, there is the danger that a user who is not concentrating will obtain an incorrect measurement through an incorrectly performed addition or by forgetting the addition. Moreover, there is the danger that the corner-measuring bracket will become detached from its locked position perpendicular to the measuring stop, so that the predetermined addition constant does not correspond to the actual conditions.

It is the object of the invention to provide a simple, reliable and economical mechanical device which permits a distance measurement with a distance-measuring apparatus both from a corner line and from a flat surface with, in each case, the same measuring stop, the same measuring procedure and an immediate correct distance indication on the display.

This object is achieved, according to the invention, by the features stated described herein. Advantageous embodiments and further developments of the invention are also described herein.

On the one hand, the rear measuring stop of the distance-measuring apparatus is, according to the invention, linear. The linear measuring stop should preferably run parallel to the width of the apparatus. The linear form of the measuring stop can be achieved, for example, by tapering the housing of the apparatus towards the back. Two flat surfaces can taper to an acute angle and form a sharp edge as a contact line. The distance to an object point is measured perpendicularly from this edge.

Such a sharp edge is ideal for a corner measurement. The edge lies directly on the corner line which is formed by two adjacent wall surfaces. The contact with the corner line is retained even when the measuring apparatus is swivelled. For example, especially in the case of the measurement of the diagonals of a square base area in a room, the angle between the measuring apparatus and the side walls forming the corner line is 45°. In the general case of a rectangular base area, this angle deviates from 45° and does so all the more the narrower the shape of the rectangle. A sharp edge as a measuring stop can always be brought into direct contact with the corner line.

As an alternative to an edge, the rear measuring stop can also be designed with a more appealing shape. For example, it can be rounded to give a cylindrical shape. With a cylindrical measuring stop, too, a single contact line with the corner line of two walls is possible provided that the radius of curvature of said stop is smaller than that of the corner line. It is for this reason that an appropriate radius of curvature is chosen since the distance is in fact measured from the rearmost line of the measuring stop. If, owing to a larger radius of curvature, the measuring stop is to rest against both wall sides and hence form two contact lines, this leads only to unimportant deviations in the measurement which are well within the measuring tolerances usual in practice. The same also applies in the case of the diagonal measurement in very narrow rectangular rooms in which the measuring stop can likewise form two contact lines with the walls.

With such a linear measuring stop, a distance measurement perpendicular to a corner line is thus first possible as regular measurement. If, on the other hand, it is also intended to measure from a flat surface therewith, the linear shape of the measuring stop gives a stable right angle to the surface along the line but not transverse thereto. The measuring apparatus would roll on the cylindrical surface. To avoid the instability of this transverse direction, according to the invention the linear measuring stop is divided into at least two stop regions, one measuring stop region being rotatable about an axis running parallel to the measuring direction. Consequently, the rotatable measuring stop region moves on rotation in a plane perpendicular to the measuring direction. Owing to the rotation, the linear measuring stop regions run in different directions and thus spread over a plane. They therefore give the distance-measuring apparatus stability on a flat support surface and result in perpendicular alignment of the measuring direction relative to the support surface.

Thus, by a small manipulation, namely the rotation of part of the measuring stop, it is possible to carry out a measurement perpendicularly from a flat surface, such as, for example, from a wall surface or floor surface, to an opposite surface or to a specific point. Alternatively, it is possible to measure perpendicularly from a corner line. In both types of measurement, the linear rear measuring stop serves as a baseline for the distance measurement. Accordingly, the user can also read the measured distance value directly from the display of the apparatus in both types of measurement. Owing to the unstable position of the rear stop line on a surface, the user will inevitably be reminded to actuate the rotatable part in order to achieve a stable support.

Embodiments of the invention are explained in more detail below with reference to the drawing.

Figure 1B:
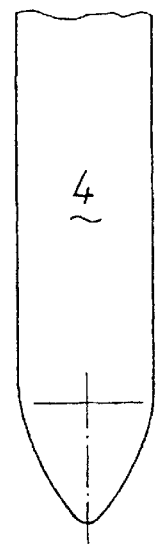
Figure 1C:
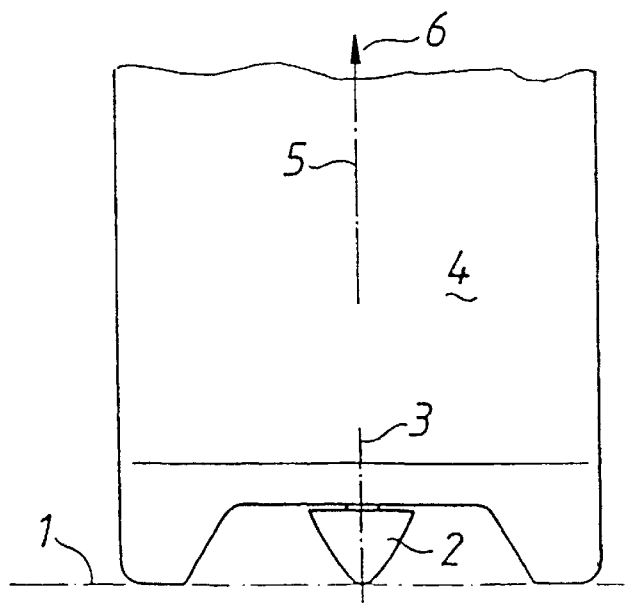
Figure 1D:
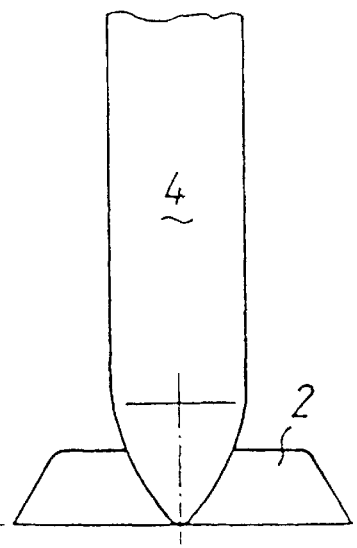

FIG. 1a schematically shows a distance-measuring apparatus which can be held in the hand and has a measuring stop device according to the invention, FIG. 1b shows a side view of the measuring stop device shown in FIG. 1a, FIG. 1c shows a measuring stop device in which the rotatable measuring stop region is rotated by 90° relative to FIG. 1a, FIG. 1d shows a side view of the measuring stop device shown in FIG. 1c, FIG. 2 shows a rotatable measuring stop region arranged asymmetrically with respect to the distance-measuring apparatus and FIG. 3 shows a measuring stop device having two rotatable measuring stop regions.

In FIG. 1a, a distance-measuring apparatus 4 which can be held in the hand and has a linear rear measuring stop 1 according to the invention is shown schematically. The said stop is divided into two measuring stop regions 1a, 1b. The left and right measuring stop region 1a is connected rigidly to the distance-measuring apparatus 4 whereas the measuring stop region 1b located in between is rotatable about an axis 3. In this embodiment, the axis 3 and the longitudinal axis 5 of the apparatus coincide with one another. In addition, the direction of the longitudinal axis 5 of the apparatus is identical to the measuring direction 6 of the distance-measuring apparatus 4. The measuring direction 6 is the direction to an object or object point to which the distance is to be measured, and it is perpendicular to the rear measuring stop 1.

Since, on the one hand, the measuring stop 1 is linear and, on the other hand, the distance-measuring apparatus 4 has a certain thickness, there is in between a transition zone 2, 2a which may have different forms. The distance is to be measured, and it is perpendicular to the rear measuring stop 1.

Since, on the one hand, the measuring stop 1 is linear and, on the other hand, the distance-measuring apparatus 4 has a certain thickness, there is in between a transition zone 2, 2a which may have different forms. The forms may be, for example, flat surfaces which taper to a sharp edge, the sharp edge being the measuring stop regions 1a, 1b. The transition zones 2, 2a can however also have a curved surface, as shown in FIG. 1a or in the associated side view in FIG. 1b. The measuring stop regions 1a, 1b are rounded to a cylindrical shape. If the rigidly arranged measuring stop region 1a and the rotatable measuring stop region 1b are aligned in a line (FIGS. 1a, 1b), the distance-measuring apparatus 4 can thus readily be brought into contact with a corner line formed by two walls. A distance measurement from a corner line is thus possible without problems. The measured distance value shown on the display of the distance-measuring apparatus 4 itself corresponds to the distance from the corner line to the object sighted. An addition to be performed by the user, as in the prior art, is thus no longer necessary.

If, on the other hand, the distance-measuring apparatus 4 is to be brought into contact with a flat surface, perpendicular thereto, according to the invention the rotatable measuring stop region 1b can be rotated about the axis 3. Any desired angle relative to the orientation of the rigidly arranged measuring region 1a can be set. Since the axis 3 runs parallel to the measuring direction 6 of the distance-measuring apparatus 4, the measuring stop regions 1a, 1b are always in a plane perpendicular thereto. FIG. 1c shows the measuring stop region 1b in a position rotated 90° relative to the measuring stop region 1a. FIG. 1d shows the associated side view. Thus, the measuring direction 6 is oriented in a stable manner at right angles to the support surface of the distance-measuring apparatus 4 and the measurement is carried out from the same measuring stop 1 as is the case for the corner line measurement.

In general, it is possible to carry out a distance measurement both from a corner line and from a flat surface with a stable measuring stop 1 with the aid of the rotatable measuring stop region 1b and the linear design of the measuring stop regions 1a, 1b. Since measurement is always carried out from the same measuring stop 1, there is no longer any need to correct the measured distance value displayed.

FIG. 2 shows a variant of the invention having an asymmetrically arranged rotatable measuring stop region 1b whose axis 3 is offset parallel with respect to the longitudinal axis 5 of the apparatus. In addition, a measuring stop region 1a rigidly connected to the distance-measuring apparatus 4 is provided only on one side of said apparatus. This increases the length of the rotatable measuring stop region 1b, which, when positioned transverse to the rigid measuring stop region 1a, forms a large triangular support surface with it. This makes the distance-measuring apparatus 4 even more stable.

FIG. 3 shows a further embodiment having two measuring stop regions 1a, 1b, each rotatable about an axis 3a, 3b. If the measuring stop regions 1a, 1b are in a line, a distance measurement from a corner line is possible, as already shown under FIG. 1a and FIG. 1b and described. For the distance measurement from a flat surface, the two measuring stop regions 1a, 1b or the transition zones 2a, 2b connected to them can be rotated about their respective axes 3a, 3b. For example, they can be rotated in opposite directions and until they are aligned approximately perpendicular to their previous position. This too results in very high stability of the distance-measuring apparatus 4. This gives rise to somewhat higher manufacturing costs. As long as there is no gear connection or no drive belt between the two axes 3a, 3b, two manipulations are required for corresponding settings, compared with only one manipulation in the embodiments according to FIG. 1 and FIG. 2.

What is claimed is:

1. A distance-measuring apparatus which can be held in the hand, comprising:

a body having a front portion and a rear portion; and a rear measuring stop disposed at the rear portion of the body and running perpendicular to a measuring direction, wherein the rear measuring stop is linear and is divided into first and second measuring stop regions, wherein the first measuring stop region is rotatable about a first axis running parallel to the measuring direction, and wherein a rear-most portion of the first measuring stop region and a rear-most portion of the second measuring stop region lie in the same plane regardless of an angle of rotation of the first rotatable measuring stop region about the first axis.

2. The distance-measuring apparatus according to claim 1, wherein the first rotatable measuring stop region is laterally symmetrical with respect to the first axis.

3. The distance-measuring apparatus according to claim 2, wherein the first axis coincides with a longitudinal axis of the distance-measuring apparatus.

4. The distance-measuring apparatus according to claim 2, wherein the first rotatable measuring stop region is arranged asymmetrically with respect to the longitudinal axis of the distance-measuring apparatus.

5. The distance-measuring apparatus according to claim 2, wherein the first measuring stop region is rotatable about the first axis and the second measuring stop region is rotatable about a second axis, oriented parallel to the first axis.

6. The distance-measuring apparatus according to claim 1, wherein the first axis coincides with a longitudinal axis of the distance-measuring apparatus.

7. The distance-measuring apparatus according to claim 1, wherein the first rotatable measuring stop region is arranged asymmetrically with respect to the longitudinal axis of the distance-measuring apparatus.

8. The distance-measuring apparatus according to claim 1, wherein the first measuring stop region is rotatable about the first axis and the second measuring stop region is rotatable about a second axis oriented parallel to the first axis.

9. The distance-measuring apparatus according to claim 8, further comprising:

a first transition zone formed between the first measuring stop region and the body of the distance-measuring apparatus; and a second transition zone formed between the second measuring stop region and the body of the distance-measuring apparatus.

10. The distance-measuring apparatus according to claim 1, wherein the first and second measuring stop regions have rounded edges.

11. The distance-measuring apparatus according to claim 1, further comprising:

a transition zone formed between the rear measuring stop and the body of the distance-measuring apparatus.

12. The distance-measuring apparatus according to claim 11, wherein the transition zone has a flat surface which tapers to a sharp edge at the first measuring stop region.

13. The distance-measuring apparatus according to claim 11, wherein the transition zone has a curved surface.

\* \* \* \* \*